Nov. 6, 1962

S. SOHACKI 3,062,920

TELEPHONE DIALING SYSTEM

Filed Dec. 11, 1958

3 Sheets-Sheet 1

INVENTOR

Steven Sohacki

BY Alexander & Dowell

ATTORNEY

Nov. 6, 1962

S. SOHACKI 3,062,920

TELEPHONE DIALING SYSTEM

Filed Dec. 11, 1958

3 Sheets-Sheet 2

INVENTOR

Steven Sohacki

BY Alexander & Dowell

ATTORNEY

Nov. 6, 1962 S. SOHACKI 3,062,920

TELEPHONE DIALING SYSTEM

Filed Dec. 11, 1958 3 Sheets-Sheet 3

INVENTOR

Steven Sohacki

BY

Alexander & Dowell

ATTORNEY

United States Patent Office 3,062,920

Patented Nov. 6, 1962

3,062,920

TELEPHONE DIALING SYSTEM

Steven Sohacki, P.O. Box 777, Gary, Ind.

Filed Dec. 11, 1958, Ser. No. 779,616
10 Claims. (Cl. 179—90)

This invention relates to automatic telephone dialing systems, and more particularly to a system which includes both a novel telephone dialing unit and also novel circuitry whereby, upon initiation of a predetermined event, the telephone is automatically dialed and a coded message delivered to the telephone station whose number is called, such a system being useful either as an alarm system or as an automatic message delivering system.

It is a primary object of this invention to provide an accurate and reliable dialing system which can be easily adjusted to dial any predetermined number, and which is compact and simple enough to be a practical addition to the telephone of an average subscriber.

It is another principal object of the invention to provide a telephone dialing system which will not arouse telephone-company opposition, the present dialing system being applied to a telephone without tampering with the internal workings thereof.

It is still another major object of the invention to provide a dialing system which will faithfully dial the correct number every time without substantial risk of error.

A further important object of the invention is to provide a dialing unit having a dialing "finger" which rotates continuously and which intermittently engages the telephone dial, turns it through the correct angle and then releases it to return by its own spring action to the Stop position. This structure avoids having the dialing "finger" remain engaged with the dial during the return rotation of the dial to its Stop position, thereby eliminating any drag by the present unit on the dial and thus reducing the likelihood of error, inasmuch as the dial actually performs its pulsing operations during said return rotation.

Yet another object of the invention is to provide an improved system in which the handset is previously removed from the telephone so that it need not be lifted by the present dialing system. Instead, the "hang-up" buttons are normally held down by the superior force of a spring in the present dialing unit. A solenoid is employed to counteract the force of the spring when the dialing unit is rendered operative, and thus the buttons are permitted to rise under their own power when the solenoid is energized. In the event of a power failure, the spring instantly lowers the buttons again to return the telephone to a normal "hung-up" position.

A further object of this invention is to provide a system in which printed circuit digit discs are rotated within the unit to provide electrical control of the dialing as a function of the position of the mechanism. A plurality of contacts are provided to wipe the printed circuits on the discs, and non-conductive shields are laid over the faces of the disc in order to mask part of the printed circuit on each disc and thereby adjust the arc on each disc through which the associated contact wipes the printed circuit, the length of this arc being simply and easily altered for the purpose of changing the telephone number which the present unit dials without the necessity of altering any of the structures of the parts or interchanging contact discs when changing the telephone number to be automatically called.

When the system is used as an alarm, it is an object of this invention to provide code means for identifying the particular alarm system to the telephone station which it calls, and for transmitting a different message for each one of several possible types of emergency, i.e. different messages respectively signifying fire, burglary, etc. The present system dials the number of the station to be called, delivers the appropriate message, "hangs up," and then redials the same number, redelivers the same message and again "hangs up," such cycle being repeated several times for the sake of verification of the call before the system automatically shuts itself off.

Other objects and advantages of the present invention will become apparent during the detailed discussion of the drawings, wherein.

Figure 1:
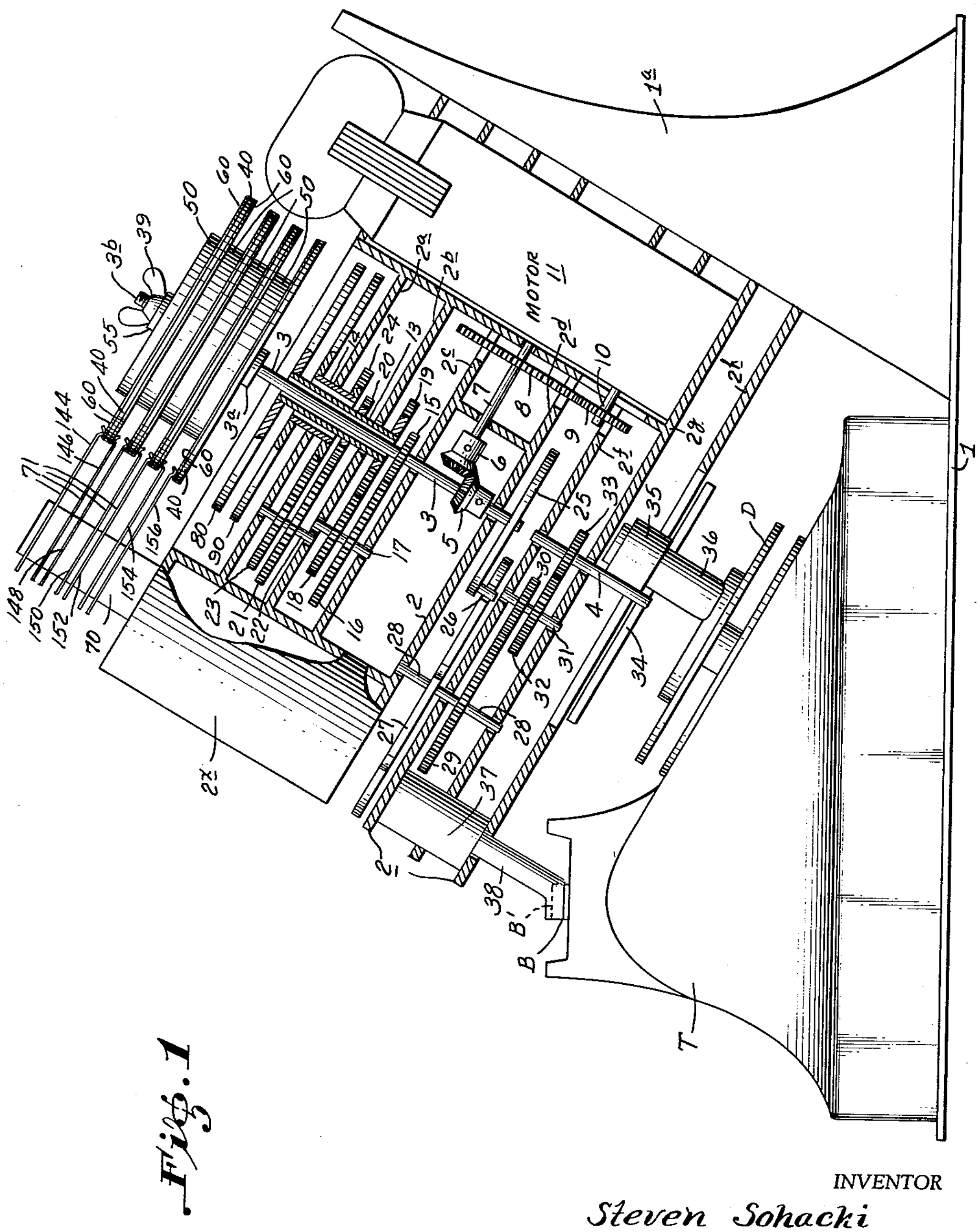
FIG. 1 is an elevation view, partly in section, showing the mechanism of the novel telephone dialing unit located opposite a conventional telephone dial.

Referring now to the dialing unit of FIG. 1, this unit includes a base 1 supporting a telephone unit T having a conventional dial D and having a set of "hang-up" buttons B in the telephone unit cradle for normally retaining the telephone in off or "hung-up" condition. An alternate position of the button B is shown at B' and in this position the telephone is activated. The base 1 supports an upright member *1a* which in turn supports the dialing unit mechanism.

This dialing unit comprises a frame 2 including a plurality of spaced plates bearing the reference characters *2a*, *2b*, *2c*, *2d*, *2f*, *2g* and *2h*, and these plates have central apertures therethrough in which are journaled a control shaft 3 and a dialing shaft 4, these shafts being mutually separate. The control shaft 3 carries a bevel gear 5 driven by another bevel gear 6 attached to a shaft 7 which is rotated by speed-reduction gears 8 and 9, the gear 9 being driven by the shaft 10 of a motor 11. Two sleeves 13 and 14 are respectively carried on the shaft 3 and are mutually arranged in coaxial relation with each other and with that shaft. A gear 15 is fixed to the shaft 3 and drives a larger gear 16 on a stub shaft 17 which in turn drives another gear 18, the latter gear driving a gear 19 which is fixed to the sleeve 13. Thus it will be seen that by the gears 15, 16, 18 and 19 rotary motion is transferred from the shaft 3 to the sleeve 13, and the rotation of the sleeve 13 is at a rate reduced as compared with the rate of rotation of the shaft 3, as will be more fully discussed hereinafter.

The sleeve 13 also carries another gear 20 and this gear in turn drives a gear 21 carried on a stub shaft 22, and this stub shaft drives a gear 23 which in turn drives a gear 24 fixed to the sleeve 14, and rotating this sleeve at a still further reduced rate as compared with the rate of rotation of the sleeve 13 and of the shaft 3.

Figure 4:
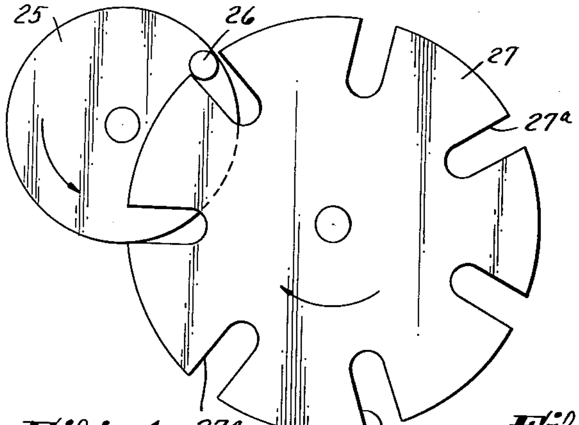
FIG. 4 is an enlarged view of a Geneva mechanism employed in the dialing unit.

At the lower end of the shaft 3 is fixed a Geneva wheel 25 having a drive pin 26 thereon and engaging and driving a Geneva disc 27 carried by a shaft 28. The Geneva wheel 25, the pin 26 and the geneva disc 27 can be seen in elevation in FIG. 4, and it will be noted that there are seven slots 27*a* located around the periphery of the Geneva disc 27, one slot corresponding with each digit of a standard seven-digit telephone number to be dialed, i.e. three slots representing the exchange and initial number, and four slots representing the four numbers subsequently to be dialed. The shaft 28 which carries the Geneva disc 27 also carries a gear 29 which in turn drives another gear 30, this latter gear being fixed on a shaft 31. The rotation of the gear 30 is thus transferred by the shaft 31 to a gear 32 which in turn drives another gear 33 which is fixed on the dialing shaft 4. At the lower end of the dialing shaft 4 is located a dialing member in the form of a disc 34 which carries a solenoid 35 having a dialing "finger" 36. The dialing "finger" 36 contacts the dial D of the telephone and the rotation of the disc 34 causes the dialing "finger" 36 to rotate the dial D. Ordinarily, the dialing "finger" 36 is retracted into the solenoid 35 by a spring (not shown), but whenever the solenoid 35 is energized, the dialing "finger" 36 will be lowered downwardly so that it engages one of the finger holes in the dial D in the manner to be explained more fully hereinafter. An additional solenoid 37 is carried on the frame 2 and has a plunger 38 which is normally urged in a downward direction by a spring (not shown) so that when the solenoid 37 is de-energized, the plunger 38 will push the button B downwardly to maintain the telephone in the "hung-up" condition. Conversely, when the solenoid 37 is energized, the plunger will be drawn upwardly away from the button B and thereby permit the button B to rise to the position B′ in which the telephone is activated.

The circuit by which the solenoids 35 and 37 are actuated will be discussed hereinafter in connection with FIG. 2.

Figure 3:
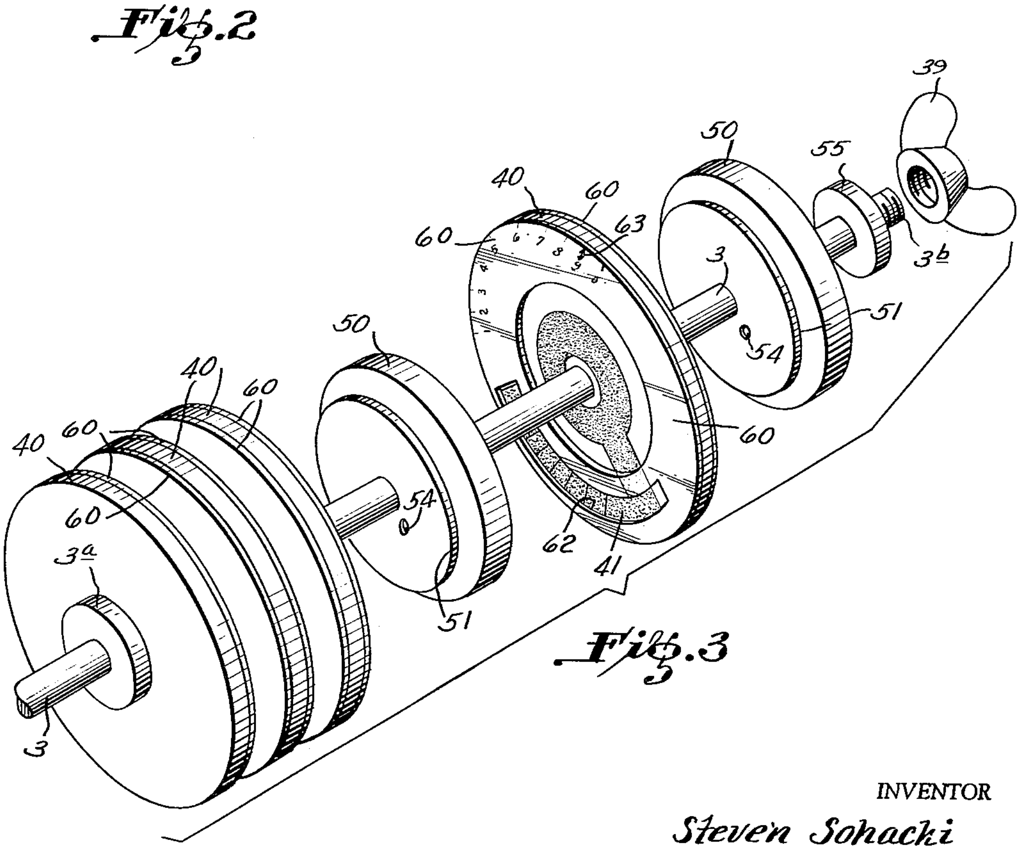
FIG. 3 is an enlarged perspective view, partly exploded, to show the manner of assembly of the printed circuit digit discs, the non-conductive shields overlying the discs, and the spacers between discs.

Referring to FIGS. 1 and 3, near the upper end of the shaft 3 there is an annular abutment 3*a* and above this abutment 3*a* the shaft is provided with a flat side (not shown) for the purpose hereinafter described. Finally, at the top of the shaft 3 there is a threaded portion 3*b* into which a wing nut 39 is screwed.

Figure 5:
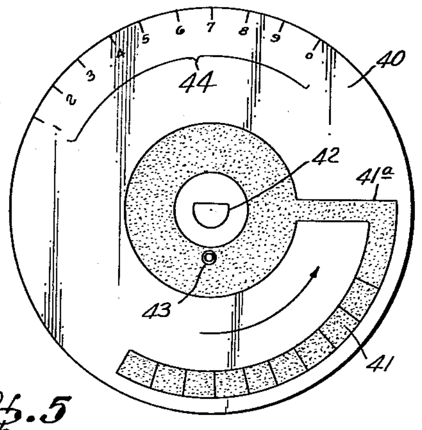
FIG. 5 is an enlarged view of one of the printed-circuit digit discs.

Between the abutment 3*a* and the wing nut 39 is located the digit disc assembly shown in FIG. 3. This digit disc assembly comprises four digit discs 40, each identical to the digit disc shown in FIG. 5, and each digit disc except the lowermost includes printed circuits on both sides thereof. These printed circuits will be further described subsequently. In the perspective view shown in FIG. 3, the lower three digit discs 40 are shown bunched together, and the uppermost digit disc 40 is shown in spaced relation with respect thereto so as to permit one face of this disc to be seen.

Figure 7:
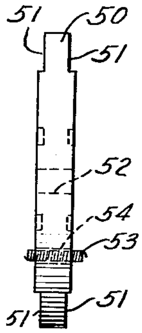
FIG. 7 is a side view of the spacer shown in FIG. 6.
Figure 6:
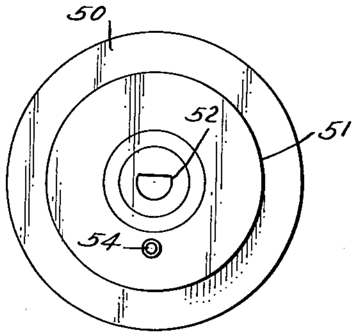
FIG. 6 is an enlarged view of one of the digit disc spacers.

Between each pair of digit discs there is located a spacer 50, as seen in detail in FIGS. 6 and 7, and these spacers are each provided with annular recesses 51 on each side of the disc, for the purpose of supporting the plastic shield rings 60 which have central bores 61 adapted to receive a recessed shoulder 51 of a spacer 50. From FIG. 2 it can be seen that there are seven shield rings 60, and that these shield rings directly overlie the printed circuits of the digit discs 40, the shield rings each having an aperture 62 for the purpose hereinafter discussed.

As stated above, the shaft 3 has a flat side, and the central hole 42 through each digit disc 40 and the central hole 52 through each spacer 50 are shaped to match the shape of the shaft so that the spacers 50 and the digit discs 40 cannot rotate thereon. However, each shield ring 60 is rotatable on the shoulder 51 of the associated spacer, providing the wing nut 39 at the upper end of shaft 3 is loosened on the threads 3*b*. When so loosened, the shield rings can be rotated relative to the digit discs 40 for the purpose of changing the extent to which the aperture 62 of each shield ring masks the printed circuit portion 41 of the associated digit disc. All of the printed circuits 41 of the various digit discs are electrically interconnected by means of eyelets 43 which pass through the digit disc and connect the printed circuits 41 on each side of the disc together, and in addition, the printed circuits on the several discs are interconnected by means of a plurality of springs 53 which pass through bores 54 in the spacers 50. The springs 53 make contact with the printed circuits 41 and connect all of these circuits together. These circuits in turn can be connected either to the shaft 3 or to a contact wiper (not shown). The details of the circuit will be further explained in connection with FIG. 2. Between the wing nut 39 and the uppermost spacer disc 50 there is located a bearing washer 55, as shown in FIGS. 1 and 3.

Each shield ring 60 has an indicia arrow 63 printed on the face of the shield ring, which shield ring is made of transparent non-conductive material. Since the shield rings are transparent, ten numbers 1 through zero inclusive are visible through the transparent shield ring, these numbers being carried on the face of each digit disc and being generally designated by the reference character 44. When the arrow 63 on a shield ring 60 is aligned with one of the numbers 44 on the face of a digit disc, that digit disc will be so arranged that the corresponding number pointed to by the arrow 63 will be dialed when that particular digit disc is selected during the dialing operation, as will be hereinafter explained.

As can best be seen at the upper end of FIG. 1, an insulated spacer block 70 carries a plurality of spaced electrical contact "fingers" generally designated by the number 71. These contact "fingers" normally ride on the outer faces of the shield rings 60, but when an aperture 62 in a shield ring passes beneath a contact, the contact extends through the aperture 62 and wipes the printed circuit 41 of the associated digit disc. The relative position of the shield ring aperture 62 with respect to the arc of the printed circuit 41 determines the angle through which the contact "finger" 71 will be energized as the digit disc 40 rotates with respect to the "finger" 71.

As stated in the portion of the description above relating to the gear drive mechanism, the sleeve 13 is driven by a system of reduction gears 15, 16, 18 and 19 from the shaft 3, and the sleeve 13 rotates at a much slower rate than the shaft 3. At the upper end of the sleeve 13 there is mounted a sequence disc 80 which rotates with the sleeve 13 and passes under a plurality of contact "fingers," which are mounted similarly to the contact "fingers" 71 and which overlie the sequence disc 80 but which have been omitted from FIG. 1 for the sake of simplicity. These contact "fingers" will be explained in connection with FIG. 2. The sequence disc 80 performs two functions: first, it selects which of the digit discs will be electrically activated on each revolution of shaft 3; second, the sequence disc 80 carries a code on one side thereof which provides a pulsed code over the telephone in order to identify the particular dialing system making the call.

The other sleeve 14 which is concentric with the sleeve 13 and with the shaft 3 carries a cycle disc 90 near its upper end, and rotates at a rate which is still slower than the rate of rotation of the sleeve 13 and sequence disc 80. The cycle disc 90 performs only one revolution whenever the dialing apparatus is energized, and contains an annular printed circuit 91 which is continuous except for a small gap 92. The cycle disc also operates with an additional set of contacts which are not shown in FIG. 1 but which will be hereinafter described in connection with the circuit of FIG. 2. When these contacts are riding on the annular printed circuit portion 91 of the cycle disc 90, electricity is supplied to operate the dial unit, but when these contacts arrive at the gap 92 the circuit is broken and the entire dialing system is turned off.

Figure 2:
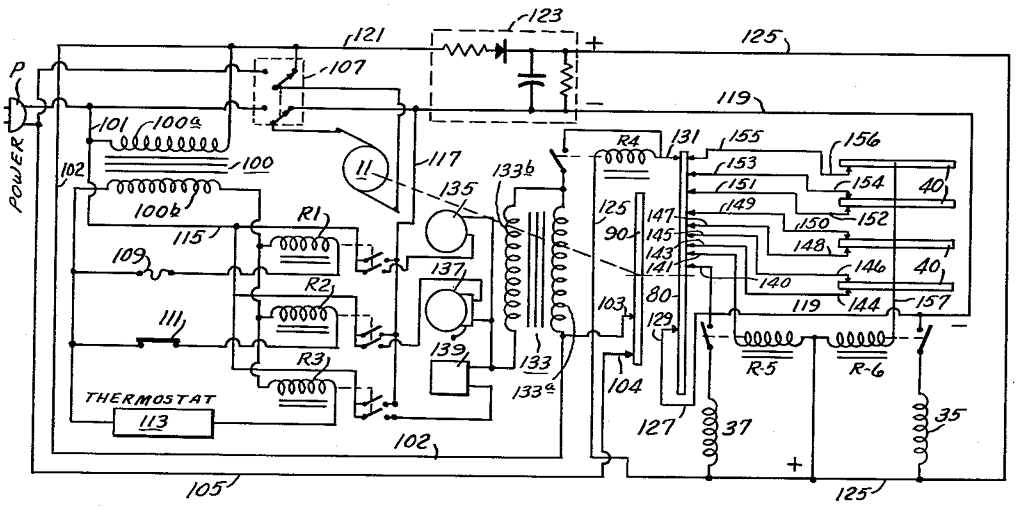
FIG. 2 is a schematic diagram showing the circuit of the novel dialing system, some of the mechanical parts of the dialing unit also being included in the circuit illustrated in FIG. 2.

Referring now to the electrical circuit shown as an illustrative embodiment in the schematic diagram of FIG. 2, alternating current is supplied to the circuit from the plug P and energizes the primary winding 100*a* of the transformer 100 through the wire 101 on one side of the A.C. line, and on the other side through the wire 102, the contact 103, the printed circuit on the cycle disc 90, and the contact 104 which is connected to the wire 105 which goes to the other side of the A.C. line plug P. By reference to FIG. 9 it will be seen that the printed circuit 91 connects together the contacts 103 and 104 in all positions of the disc 90 except the position in which the gap 92 is opposite these contacts.

When the mechanism has completed a call, it will stop with the gap 92 adjacent the contacts 103 and 104. In this position, the mechanism will remain de-energized until it is manually reset. For this purpose, a switch 107 is employed. This is a double-pole, double-throw switch which normally remains in the position shown in FIG. 2 but which when actuated moves the wiper contacts to the left for the purpose of connecting the motor 11 directly across the power line. The system can then be reset merely by temporarily actuating the switch 107 and thereby energizing the motor until the disc 90 is rotated far enough to move the disc to a position in which the contacts 103 and 104 will fall upon a portion of the printed circuit 91.

In this position, the primary winding of the transformer 100 is energized and the secondary winding 100*b* supplies power to the relays R1, R2 and R3. One side of the secondary winding 100*b* is directly connected to one side of the winding of each of these relays, and the other sides of the windings of the relays are connected to the other side of the transformer secondary 100*b* by way of several different warning devices, such as a fusible link 109 serving as a fire warning device, a normally closed switch 111 which can serve as a burglar alarm, and a normally closed thermostat switch 113 which can serve as a thermal alarm, for instance, to warn if the furnace becomes inoperative in a house. These warning devices 109, 111 and 113 are all normally conductive and therefore the relay windings R1, R2 and R3 remain energized in the absence of an external stimulus which would break the circuit through one of the warning devices.

As long as the windings of the relays R1, R2 and R3 are energized, the relay contacts are open, as shown in the drawing, and therefore no current can flow therethrough. However, when one of the warning devices 109, 111 or 113 is actuated to break the circuit to the winding of one of the relays, the contacts of that particular relay close and thereby current is supplied from one side of the power line through the wire 101, the wire 115, and the wire 117, and thus the wire 119 becomes connected to one side of the power line. The wire 121 is already connected to the other side of the power line by way of the disc 90 and the contacts 103—104, and therefore power from the A.C. supply line is furnished to a rectifier unit 123.

The output of the rectifier unit is a uni-directional current supplied on the minus side to wire 119, and on the plus side to wire 125. It is actually not necessary that a rectifier unit be employed, but this has proven to be desirable inasmuch as several solenoids are to be operated by this electrical current and operation is quicker and quieter on direct current than it is on alternating current.

Before proceeding to describe the operation of the digit disc and solenoids, it is to be noted also that whenever one of the relays R1, R2 or R3 is de-energized, and the circuit is closed to energize the rectifier 123 in the manner described above, direct current is supplied via the line 125 to the winding of a relay R4 and the other side of the winding of this relay is connected to a contact 131 of the disc 80. Direct current is supplied also from the other side of the rectifier by way of lines 119 and 127 to the contact 129 on the disc 80 and when the disc is in such a position that the contacts 129 and 131 are connected together by the printed circuit 83, the relay R4 closes a switch and energizes the primary winding 133*a* in transformer 133. One side of the primary winding 133*a* is connected to one side of the power line through the wire 121, and the other side of the primary winding 133*a* is connected through the contact of the relay R4 and the contacts 129 and 131 and the line 119 to the other side of the A.C. power line.

Figures 9, 10:
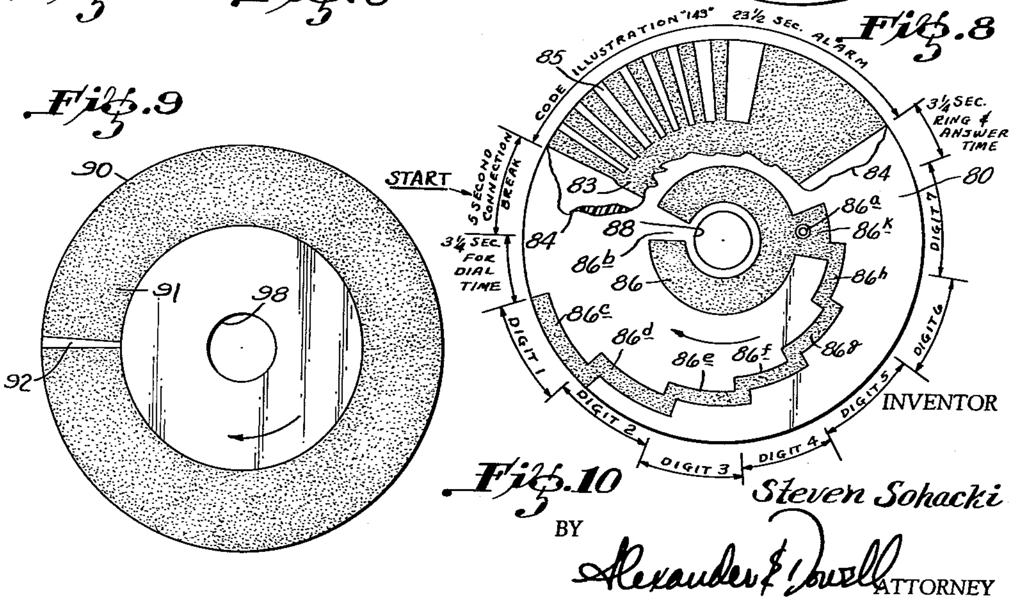
FIG. 9 is an enlarged view of a cycle disc having a printed circuit on the face thereof.
FIG. 10 is an enlarged view of a sequence disc, this disc being partly broken away to show an identification and alarm code circuit, this circuit being located on the opposite side of the disc from the sequence circuit shown on the lower portion of the disc.

The printed circuit 83 on the sequence disc 80 is on the reverse side of the disc, the insulating portion of the disc 80 having been broken away along line 84 in FIG. 10 in order to show a portion of the printed circuit on the other side of this disc. It is the printed circuit 83 on the back side of the disc 80 which connects together the contacts 129 and 131. Notice that this printed circuit is not continuous but is provided with a plurality of slots 85 which expose non-conductive areas such that as the sequence disc 80 is rotated by the motor 11 contact will alternately be made and broken between the contacts 129 and 131 with the result that the current will be supplied to the primary winding 133*a* of the transformer 133 intermittently. The secondary windings 133*b* of the transformer 133 are respectively connected to one side each of a siren 135 associated with the relay R1, a bell 137 associated with the contacts of relay R2, and a buzzer 139 associated with the contacts of relay R3. These devices are capable of making distinctly different noises, and thereby of identifying the emergency warning devices 109, 111 or 113 which has been tripped. Also, as the disc 80 rotates so as to wipe the printed circuit 83 across the contacts 129 and 131, the noise-making device 135, 137 or 139 which is actuated will be rung in an intermittent manner to provide a code for the sake of identifying which automatic dialing unit is placing the emergency call. Thus, it will be seen that by this circuit the calling unit identifies itself and also identifies the type of emergency which it is reporting.

Turning now to the operation of the dialing members per se, the solenoids 35 and 37, previously described in connection with FIG. 1, each has one side of its winding connected to the source of positive rectified current comprising the line 125. Also there are two other relays R5 and R6 which each have one side of their windings connected to the source of positive power at line 125. When the motor is started rotating by a stimulus which opens one of the warning devices 109, 111 or 113 and thereby permits the contacts to close on one of the relays R1, R2 or R3, the digit discs 40 and also the sequence disc 80 and cycle disc 90 begin to rotate. Referring to FIG. 10, it will be seen that the front surface of sequence disc 80 carries a printed circuit 86 and that this printed circuit 86 is connected to the printed circuit 87 on the back of sequence disc 80 by an eyelet 86*a*. A contact 140 is connected to the negative side of the rectified source of power by way of the line 119 and thus both sides of the sequence disc are connected to the line 119. As the disc begins to rotate, a contact 141 which has initially been resting adjacent the gap 86*b* in the printed circuit 86 begins wiping this circuit and is thereby grounded to the contact 140 and thus to the negative side of the power line 119. This completes the circuit through the winding of the relay R5, thereby connecting it across the output of the rectifier 123 and closes the contact of the relay R5. The closing of this contact energizes the relay 37, and as stated in connection with FIG. 1, the energized solenoid 37 retracts the plunger 38 upwardly into the solenoid and permits the buttons B on top of the telephone cradle to rise and thereby prepare the telephone for the dialing operation. Although only one solenoid 37 has been shown in FIG. 2, it is to be understood that two solenoids can be used in the cases where there are two telephone buttons to be depressed. By placing two solenoids in parallel, a more positive action can be secured.

The telephone then is in condition for dialing just as though the handset had been removed from the cradle.

Figure 8:
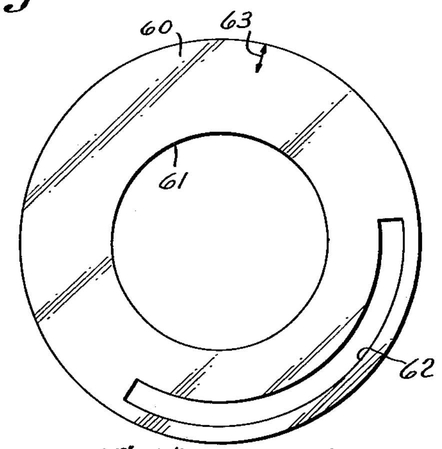
FIG. 8 is an enlarged view of one of the plastic shield discs for masking part of the printed circuit of a digit disc.

Upon continued rotation of the sequence disc 80 shown in FIG. 10, a first contact arc 86*c* will energize the contact 143 which will in turn furnish power to the uppermost contact 144 on the bank of digit discs. The current supplied to the contact 144 is from the minus side 119 of the rectifier 123, and the power furnished to contact 144 will be transferred to the printed circuit 41 of the digit disc 40, FIG. 5, through the aperture 62 of the shield ring 60, shown in FIG. 8. When current is thus supplied through the printed circuit 41 from the line 119, it is also supplied to the line 157 and thereby to the relay R6. The contact of the relay R6 is thereby closed, and the dialing solenoid 35 is thereby connected across the output rectifier 123. The dialing "finger" 36 is extended by action of the solenoid 35, and the "finger" enters a hole in the dial D and begins rotating the dial in the manner to be explained hereinafter. After the arc 86*c* has completed its travel, the arc 86*d* then energizes the contact 145 which in turn energizes a contact 146 on the back of the first digit disc 40, and again causes the relay R6 to close its contact and energize the dialing solenoid 35. In a similar manner, when the arc 86*d* has passed the contact 145, the arc 86*e* then sequentially wipes the contact 147, and later the arc 86*f* wipes the contact 149; the arc 86*g* wipes contact 151; arc 86*h* wipes contact 153; and arc 86*k* wipes contact 155. Thus the contacts 144, 146, 148, 150, 152, 154 and 156 are all energized sequentially by the sequence disc 80. These contacts can also be seen in FIG. 1. As stated above, the contacts which wipe against the circuits on the sequence disc 80 and on the cycle disc 90 would be mounted in the same way as the contact "fingers" 71 which support the contacts 144, 146, 148, 150, 152, 154 and 156 of FIG. 1.

Now, the relationship between the printed circuits on the discs 40, 80 and 90 and the rate of rotation by the various gear drives and transmissions shown in FIG. 1 will be explained. When the present device is set in motion by the breaking of the circuit through one of the warning devices 109, 111 or 113 and one of the relays R1, R2 or R3 is closed, the motor begins driving the discs, and this drive continues so long as a circuit is completed through the contacts 103 and 104 of the disc 90. In the illustrated embodiment the sequence disc rotates three complete revolutions for each dialing and warning operation of the system. Initially, the sequence disc is in the position labeled "Start" and as the motor turns the disc in the direction of the arrow shown thereon in FIG. 10 the contact 141 first energizes the relay R5 at the inner ring of the printed circuit 86 and thereby raises the plunger 38 and activates the telephone for dialing. Thus, as the sequence disc 80 continues to rotate, the arc 86*c* representing digit No. 1 to be dialed is brought into contact with the "finger" 143 and thus energizes the contact 144 wiping the uppermost digit disc. The digit discs, as will be seen in FIGS. 1 and 3, are all connected together on the shaft 3 and are rotated at a higher rate of speed than the sequence disc 80. This is because of the fact that the digit discs must all complete one revolution while the sequence disc 80 moves only through the angle subtended by one of the contact arcs 86*c*, 86*d*, 86*e*, etc.

The digit discs control in turn the dialing "finger" solenoid 35 and whenever a digit disc is energized, the contact begins touching it at the leading edge 41*a*. Each time contact is made on a digit disc circuit 41 the dialing solenoid 53 is in a position which lines up with the zero hole of the telephone dial, and all dialing is done with the "finger" 36 in this hole. The appropriate contact then continues touching the printed circuit arc 41 from the initial point 41*a* to some point along the arc at which the shield ring 60 begins covering the printed circuit 41. In other words, the contact travels in the aperture 62 of the disc 60 as far as it can and when the aperture ends and the contact is thereby raised from the printed circuit 41, the solenoid 35 is de-energized and the dialing "finger" 36 is retracted into the solenoid and out of the zero-hole of the telephone dial, thereby releasing the dial to return to its normal position. As stated above, the shield ring 60 can be turned with respect to its associated digit disc 40 merely by loosening the wing nut 39.

The sleeve 13 which carries the sequence disc 80 also carries a gear 20 which forms a part of a reduction gear train including the gears 20, 21, 23 and 24. The gear 24 is connected with the sleeve 14, and this sleeve in turn carries the cycle disc 90. The reduction in the gear train 20, 21, 23 and 24 is such that the cycle disc rotates considerably slower than the sequence disc and thereby determines how many rotations the sequence disc shall complete before the cycle disc is rotated once to register the gap 92 with the contacts 103 and 104 in order to shut off the entire circuit. When so shut off, after completion of the dialing cycle, the unit can be readied again only by mechanically depressing the double-pole-double-throw switch 107 and driving the cycle disc far enough so as to bring a portion of the printed circuit 91 into contact with the contacts 103 and 104 so as to ready the circuit again for automatic operation in case one of the warning devices 109, 111 or 113 is actuated.

The cycle of the machine can be controlled such that the telephone will dial the number and deliver its message at least once, but it can also be controlled such that the telephone will be dialed and the message delivered two, three or more times before the cycle disc finally shuts off the entire system.

The legends on the outside of the sequence disc 80 in FIG. 10 indicate the various functions controlled.

The motor 11 rotates the shaft 3 at the highest rate of disc speed. The Geneva wheel 25 rotates with the shaft 3 and turns the Geneva disc 27 by one slot position each time the shaft 3 completes a revolution. The motion of the dics 27 is therefore intermittent and slow as compared with the rotation of the shaft 3. A set of step-up gears 29, 30, 32 and 33 rotate the stub shaft 4 which in turn rotates the dialing disc 34, and the step-up ratio of this gear train is such as to cause the dialing solenoid and "finger" 36 to rotate through one complete revolution each time the Geneva disc 27 is rotated through one angular movement. Thus it will be seen that each time that a contact wipes the surface of a digit disc, the disc 34 carrying the solenoid 31 does one complete revolution, since the "finger" 36 is entered in the zero hole of the telephone dial only when contact is made with a printed circuit 41 of a digit disc 40, the angle through which the "finger" 36 rotates the dial each time is dependent upon the amount of printed circuit which is exposed to contact by the shield ring 60.

A box 2*x* shown in FIG. 1 can be provided in the frame of the dialing unit for the purpose of housing the various relays and rectifiers to be associated with this system. In addition, a bracket (not shown) can be applied to the frame of the dialing unit for the purpose of holding the telephone handset when the instrument is set up for automatic operation.

For the purpose of showing a practical embodiment of the present invention, the following table of gears is provided:

| | |
|---|---|
| Gears **5** and **6** | 16 teeth, beveled. |
| Gear **8** | 88 teeth. |
| Gear **9** | 44 teeth. |
| Gear **15** | 24 teeth. |
| Gear **16** | 84 teeth. |
| Gear **18** | 12 teeth. |
| Gear **19** | 48 teeth. |
| Gear **20** | 24 teeth. |
| Gear **21** | 72 teeth. |
| Gear **23** | 48 teeth. |
| Gear **24** | 48 teeth. |
| Gear **29** | 84 teeth. |
| Gear **30** | 24 teeth. |
| Gear **32** | 48 teeth. |
| Gear **33** | 24 teeth. |

I do not limit my invention to the exact form shown in the drawings, for obviously changes may be made therein within the scope of the claims.

I claim:

1. Apparatus for automatically actuating the dial of a telephone to call a number having a predetermined plurality of digits, said apparatus comprising a rotatably mounted dialing member; a dial actuator mounted on said dialing member and biased out of contact with the dial but movable into contact therewith; a drive motor; intermittent-motion means coupling said drive motor to said dialing member for causing the drive motor to impart intermittent unidirectional rotation to said dialing member beginning at the same angular rest position for each revolution; plural dialing control means each representing one of said digits and coupled for actuation by said motion means to complete one full cycle of the control means during each rotation of said dialing member; and sequence control means actuated by said motion means for connecting in sequence during successive rotations of said dialing member one of said dialing control means to said dial actuator, each dialing control means having adjustable arc length selecting means operative to extend the dial actuator into the same aperture in the dial of the telephone prior to each intermittent revolution of the dialing member when the dialing member is in said rest position, said arc length selecting means maintaining the dial actuator extended for part of each such rotation until the dialing member has moved angularly through an arc corresponding to a particular digit to be dialed and then releasing said actuator to retract out of contact with the dial.

2. Apparatus for automatically actuating the dial of a telephone to call a number having a predetermined plurality of digits, said apparatus comprising a rotatably mounted dialing member; an extensible dial actuator mounted on said dialing member and normally biased in retracted position; a drive motor; intermittent-motion means coupling said drive motor to said dialing member for causing the drive motor to impart intermittent unidirectional rotation to said dialing member beginning at the same angular rest position for each revolution; solenoid means mounted on said dialing member and coupled to said dial actuator for causing said dial actuator to be extended into an aperture in the dial of the telephone when the solenoid is energized and to be retracted when the solenoid is de-energized; and control means coupled to the solenoid to energize the same when the dialing member is in rest position to cause the dial actuator to be inserted into the same aperture in the dial of the telephone prior to each intermittent revolution of the dialing member from said rest position and for de-energizing the solenoid during each successive revolution of the dialing member to permit the dial actuator to retract from the aperture after the dialing member has moved angularly through an arc corresponding to each particular digit to be dialed.

3. Apparatus for automatically actuating the dial of a telephone to call a number having a predetermined plurality of digits, said apparatus comprising a rotatably mounted dialing member; a first rotatably mounted drive shaft; means for coupling the dialing member to said first drive shaft; a movable dial actuator supported on said dialing member and biased out of contact with said dial but movable into contact therewith; a drive motor; a second drive shaft coupled to the drive motor to be rotatably driven thereby; a Geneva mechanism coupling said first and second drive shafts for imparting intermittent uni-directional rotation to said dialing member from the second drive shaft, said means for coupling said dialing member having a ratio such that the member stops in the same predetermined angular rest position after each intermittent revolution; plural dialing control means each representing one of said digits and coupled for actuation by said second shaft to complete one full cycle of the control means during each rotation of said dialing member; and sequence control means actuated by said second shaft for connecting in sequence during successive rotations of said dialing member one of said dialing control means to said dial actuator, each dialing control means having adjustable arc length selecting means operative to extend the dial actuator into the same aperture in the dial of the telephone prior to each intermittent revolution of the dialing member when the dialing member is in said rest position, said arc length selecting means maintaining the dial actuator extended for part of each such rotation until the dialing member has moved angularly through an arc corresponding to a particular digit to be dialed and then releasing said actuator to retract out of contact with the dial.

4. The combination defined in claim 3 in which said second drive shaft passes through a predetermined number of rest positions each corresponding with a revolution of the dial actuator and the total number at least equaling the number of digits in said predetermined plurality; and the ratio of said coupling means being such that said dialing member passes through one complete revolution as said second shaft rotates from one rest position to the next.

5. Apparatus for automatically actuating the dial of a telephone to call a number having a predetermined plurality of digits, said apparatus comprising a rotatably mounted dialing member; a dial actuator mounted on said dialing member and biased out of contact with the dial but movable into contact therewith; a drive motor; intermittent-motion means coupling said drive motor to said dialing member for causing the drive motor to impart intermittent uni-directional rotation to said dialing member beginning at the same angular rest position for each revolution; solenoid means mounted on said dialing member and coupled to said dial actuator for causing said dial actuator to be moved into an aperture in the dial of the telephone when the solenoid is energized and to be retracted when the solenoid is de-energized; a plurality of digit timing switching means synchronized with said drive motor during said intermittent rotations and respectively corresponding in number to said predetermined plurality of digits; and control means coupled to the digit timing switching means and to the solenoid for energizing the solenoid when the dialing member is in said rest position to cause the dial actuator to be inserted into the same aperture in the dial of the telephone prior to each intermittent revolution of the dialing member from said rest position and for de-energizing the solenoid during each successive revolution of the dialing member to permit the dial actuator to withdraw from the aperture after the dialing member has moved angularly through an arc corresponding to each particular digit to be dialed during the respective successive revolutions.

6. The apparatus set forth in claim 5 and in which said digit timing means includes a plurality of digit disc members carrying individual annularly disposed conductive and non-conductive portions; a drive shaft for supporting the digit disc members; means for coupling said drive shaft to said drive motor to impart rotational motion to said digit disc members in synchronism with said intermittent rotations; a corresponding plurality of digit brush members coupled with said control means for establishing selective electrical contact with the conductive and non-conductive portions of respective ones of the digit disc members; and adjustable means for individually adjusting the effective intervals of engagement of the respective digit brush members with associated portions of the digit disc members.

7. The apparatus set forth in claim 5 and in which said digit timing means includes a plurality of digit disc members carrying individual annularly disposed conductive and non-conductive portions; a drive shaft for supporting the digit disc members; means for coupling said drive shaft to said drive motor to impart rotational motion to said digit disc members in synchronism with said intermittent rotations; a corresponding plurality of digit brush members coupled with said control means for establishing selective electrical contact with the conductive and non-conductive portions of respective ones of the digit disc members; a corresponding plurality of non-conductive shields each having an aperture and each positioned to overlie a corresponding one of the disc members, each aperture of each such shield registering with a conductive portion of the corresponding disc member and each shield being individually angularly adjustable with respect to its corresponding disc member so as to mask a selectable length of such conductive portion and thus establish the length of angular travel of the corresponding disc member through which the corresponding brush member engages such conductive portion.

8. The apparatus set forth in claim 5 and in which said digit timing switching means includes a plurality of digit disc members carrying individual annularly disposed conductive and non-conductive segments; a drive shaft for supporting the digit disc members; means for coupling said drive shaft to said drive motor to impart rotational motion to said digit disc members in synchronism with said intermittent rotations; a corresponding plurality of digit brush members coupled with said control means for establishing selective electrical contact with the conductive and non-conductive segments of respective ones of the digit disc members; adjustable means for individually adjusting the length of arcuate engagement of the respective digit brush members with the corresponding segments of the digit disc members; sequence selecting means including a sequence disc member having a plurality of conductive and non-conductive segments disposed thereon; means for coupling the sequence disc member to the motor to cause the sequence disc member to be rotatably driven thereby; and contact means positioned to engage the segments on said sequence disc member for selectively connecting respective ones of said digit brush members into and out of circuit with said control means and solenoid.

9. The apparatus set forth in claim 5 and in which said digit timing switching means includes a plurality of digit disc members carrying individual annularly disposed conductive and non-conductive segments; a drive shaft for supporting the digit disc members; means for coupling said drive shaft to said drive motor to impart rotational motion to said digit disc members in synchronism wth said intermittent rotations; a corresponding plurality of digit brush members coupled with said control means for establishing selective electrical contact with the conductive and non-conductive segments of respective ones of the digit disc members; adjustable means for individually adjusting the length of arcuate engagement of the respective digit brush members with the corresponding segments of the digit disc members; a disc member having an annular conductive strip thereon with a gap therein, means for coupling said last named disc member to the drive motor for causing the drive motor to impart rotational motion to the same, and contact means positioned to selectively engage the conductive strip on said last named disc member to thereby de-energize said motor. an energized condition and to engage the gap in said conductive strip at a particular angular position of said last named disc member to thereby de-energize said motor.

10. Apparatus for actuating the dial of a telephone to call a number having a predetermined plurality of digits, said apparatus comprising a rotatably mounted dialing member; a dial actuator mounted on said dialing member and biased out of contact with the dial but movable into contact therewith; a drive motor; intermittent-motion means coupling said drive motor to said dialing member for causing the drive motor to impart intermittent uni-directional rotation to said dialing member; solenoid means mounted on said dialing member and coupled to said dial actuator to move the same, a plurality of digit disc members carrying individual annularly disposed conductive and non-conductive portions; a drive shaft for supporting the disc members; means for coupling the drive shaft to said drive motor to impart rotational motion to said digit disc member in synchronism with said intermittent rotations; a corresponding plurality of digit brush members for establishing selective electrical contact with the conductive and non-conductive portions of respective ones of the digit disc members; adjustable means for individually adjusting the length of arcuate engagement of the respective digit brush members with the corresponding portions of the digit disc members; and control means coupled to the digit brush members and to the solenoid to control the successive energizing of the solenoid in accordance with the positions of the individual adjusting means.

References Cited in the file of this patent

UNITED STATES PATENTS 2,723,314 Vasselli ---------------- Nov. 8, 1955

FOREIGN PATENTS 674,357 Great Britain ---------- June 25, 1952